(12) United States Patent
Vogel

(10) Patent No.: US 8,985,887 B2
(45) Date of Patent: Mar. 24, 2015

(54) WOBBLE JOINT FITTING FOR AN ADJUSTMENT DEVICE OF A MOTOR VEHICLE SEAT, IN PARTICULAR FOR A BACKREST JOINT FITTING

(75) Inventor: Reinhard Vogel, Erkrath (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 757 days.

(21) Appl. No.: 12/976,425

(22) Filed: Dec. 22, 2010

(65) Prior Publication Data

US 2012/0001470 A1 Jan. 5, 2012

(30) Foreign Application Priority Data

Dec. 22, 2009 (DE) .......................... 10 2009 060 430
Jun. 11, 2010 (DE) .......................... 10 2010 030 002

(51) Int. Cl.
*B60N 2/225* (2006.01)
(52) U.S. Cl.
CPC ............ *B60N 2/2252* (2013.01); *B60N 2/2254* (2013.01); *B60N 2/2258* (2013.01)
USPC ............................................ 403/97; 297/362
(58) Field of Classification Search
USPC .......... 403/93, 97; 297/362, 367, 367 R, 374; 475/175; 411/517, 522, 523
See application file for complete search history.

(56) References Cited

U.S. PATENT DOCUMENTS

| 3,554,235 | A | * | 1/1971 | Opel et al. ............... | 137/625.69 |
| 5,871,414 | A | * | 2/1999 | Voss et al. ..................... | 475/175 |
| 6,830,298 | B2 | * | 12/2004 | Koczewski ................... | 297/362 |
| 7,090,298 | B2 | * | 8/2006 | Lange ........................... | 297/362 |
| 7,090,299 | B2 | * | 8/2006 | Lange ........................... | 297/362 |
| 7,188,903 | B2 | * | 3/2007 | Finner et al. .................. | 297/362 |
| 7,243,994 | B2 | * | 7/2007 | Cha ................................ | 297/362 |
| 7,278,689 | B2 | * | 10/2007 | Guillouet ...................... | 297/362 |
| 7,281,765 | B2 | * | 10/2007 | Scholz et al. ................. | 297/362 |
| 7,285,067 | B2 | * | 10/2007 | Krambeck et al. ............ | 475/162 |

(Continued)

FOREIGN PATENT DOCUMENTS

DE 15 80 541 A 10/1970
DE 195 48 809 C1 5/1997

(Continued)

OTHER PUBLICATIONS

Dubbel Edited by W. Beitz & K.-H. Küttner, "Handbook of Mechanical Engineering—Elastic Connections (Springs)", 1994, pp. F50-F64, Springer-Verlag.

*Primary Examiner* — Michael P Ferguson
*Assistant Examiner* — Daniel Wiley
(74) *Attorney, Agent, or Firm* — McCarter & English LLP

(57) ABSTRACT

A wobble joint fitting for an adjustment device of a motor vehicle seat comprises a first fitting part, a toothed eccentric gear that has an eccentric hole and a collar, and an eccentric comprising a rotatable drive part, a control part and wedge segments, the control part comprising control surfaces that come to abut against the wedge surfaces. The fitting further comprises a second fitting part that is adjustable with respect to the first fitting part. A latching part is provided which has at least one latching tooth, biased only in an actuation position of the latching part into engagement with a latching recess, and having an actuating flank. The control part comprises an actuating portion which abuts against the actuating flank and, during a rotary movement of the control part, presses the latching tooth into abutment against the collar, and biases it into engagement into a latching recess.

19 Claims, 8 Drawing Sheets

(56) References Cited

U.S. PATENT DOCUMENTS

| | | | |
|---|---|---|---|
| 7,390,061 B2* | 6/2008 | Lange | 297/362 |
| 7,455,361 B2* | 11/2008 | Stemmer et al. | 297/362 |
| 7,461,900 B2* | 12/2008 | Lange | 297/367 R |
| 7,563,049 B2* | 7/2009 | Peters | 403/97 |
| 7,607,737 B2* | 10/2009 | Liebich et al. | 297/362 |
| 7,789,464 B2* | 9/2010 | Stemmer et al. | 297/362 |
| 8,286,777 B2* | 10/2012 | Kirubaharan | 192/223.1 |
| 2005/0110322 A1* | 5/2005 | Cha | 297/362 |
| 2005/0179297 A1* | 8/2005 | Finner et al. | 297/362 |
| 2005/0211005 A1* | 9/2005 | Lange | 74/34 |
| 2005/0231017 A1* | 10/2005 | Lange | 297/374 |
| 2006/0158013 A1* | 7/2006 | Kawashima et al. | 297/362 |
| 2006/0158014 A1* | 7/2006 | Kawashima | 297/362 |
| 2006/0290187 A1* | 12/2006 | Scholz et al. | 297/362 |
| 2006/0290188 A1* | 12/2006 | Guillouet | 297/367 |
| 2007/0108824 A1* | 5/2007 | Lange | 297/367 |
| 2007/0290540 A1* | 12/2007 | Voss et al. | 297/362 |
| 2008/0136241 A1* | 6/2008 | Stemmer et al. | 297/362 |
| 2008/0136242 A1* | 6/2008 | Stemmer et al. | 297/362 |
| 2008/0193203 A1* | 8/2008 | Voss et al. | 403/97 |
| 2009/0224589 A1* | 9/2009 | Beneker et al. | 297/362 |
| 2010/0056317 A1* | 3/2010 | Kirubaharan | 475/175 |
| 2011/0156463 A1* | 6/2011 | Thiel et al. | 297/362 |
| 2011/0254337 A1* | 10/2011 | Jiang et al. | 297/362 |
| 2012/0001471 A1* | 1/2012 | Wei | 297/362 |

FOREIGN PATENT DOCUMENTS

| | | | | |
|---|---|---|---|---|
| DE | 10136349 A1 | * | 2/2003 | B60N 2/225 |
| DE | 102 030 06 A1 | | 8/2003 | |
| DE | 10 2004 007 043 B3 | | 6/2005 | |
| DE | 10 2005 054 489 B4 | | 1/2008 | |
| DE | 10 2009 001 309 A1 | | 9/2009 | |

* cited by examiner

WOBBLE JOINT FITTING FOR AN ADJUSTMENT DEVICE OF A MOTOR VEHICLE SEAT, IN PARTICULAR FOR A BACKREST JOINT FITTING

CROSS-REFERENCE TO RELATED APPLICATIONS

This application claims priority to German Application No. 10 2009 060 430.8 filed Dec. 22, 2009 and German Application No. 10 2010 030 002.0 filed Jun. 11, 2010, which are hereby incorporated by reference in their entirety as part of the present disclosure.

BACKGROUND OF THE INVENTION

The invention relates to a wobble joint fitting for an adjustment device of a motor vehicle seat, in particular for a backrest joint fitting, with a) a first fitting part comprising an internal ring gear, b) a toothed eccentric gear that engages this internal ring gear and that has an eccentric hole and a collar, c) an eccentric comprising a rotatable drive part, a control part and wedge segments, the control part comprising control surfaces that come to abut against the wedge segments, and d) a second fitting part that is adjustable with respect to the first fitting part.

Wobble fittings are disclosed in DE 10 2009 001 309 A1, DE 10 2005 054 489 B4, DE 10 2004 007 043 B2, DE 102 030 06 A1 and DE 15 80 541 A, for example. The wrap spring is supposed to provide a run-off protection. Though in principle, the wobble joint fitting is self-locking; there are, however certain loads during the driving operation or in other situations which lead to the wobble joint fitting automatically becoming displaced nevertheless. This is referred to as the fitting running off. A wrap spring is intended to counteract this.

A wobble joint fitting is known from DE 195 48 809 C1 which, for preventing run-off, comprises a blocking ring provided in the radial plane between the wedge segments and the control part and which comprises on its outer circumference at least one latching tooth which in the normal position engages a counter toothing of the toothed eccentric gear. It is elastically biased into the engagement position. It can be withdrawn from the engaging position by means of fittings of the drive part by the drive part being rotated. The engaging position is thus cancelled and the rotary movement of the wobble joint fitting is enabled.

This solution employs a relatively complicated component forming the blocking ring. Noise-free operation is not always achieved; a development of noise between at least one latching tooth and the counter toothing can virtually not be precluded. As a rule, there is a ratchet sound.

SUMMARY OF THE INVENTION

Accordingly, it is the object of the invention to further develop the wobble joint fitting of the type mentioned herein in such a manner that the run-off protection operating with a positive fit is configured to be secure and more noise-free, is not noticed in normal operation and only engages in the case of a run-off.

Based on the wobble joint fitting of the type mentioned in the introduction, this object is achieved by the collar having latching recesses distributed over its circumference, by a latching part being provided which has at least one latching tooth, which in a normal position of the latching part is out of engagement with the latching recess and is only biased in an actuation position of the latching part into engagement with a latching recess, by the latching part further having an actuating flank, and by the control part comprising an actuating portion which comes to abut against the actuating flank and, during a rotary movement of the control part, presses the latching tooth into abutment against the collar, so that the latching tooth is biased for engagement into a latching recess.

This solution is advantageous in that a positive fit occurs only, respectively, between one latching tooth and one latching recess. Only the latching tooth required for the positive fit is biased into the engagement position by a cooperation of the actuating flank and the actuating portion once a run-off occurs. The engagement of the latching tooth and the latching recess only takes place if a run-off actually happens. The at least one latching tooth is thereby located outside the latching recess during normal operation, and a ratchet noise is reliably avoided during normal operation.

The blocking segments move during a run-off, they entrain the control part. Via its actuating portion, the control part presses against the actuating flank of the latching part. The latching tooth thus approaches the collar and comes into contact with the collar. It can thus engage into a latching recess. The engagement takes place as soon the relative movement has proceeded so far that the latching recess is located under the latching tooth.

Preferably, a latching tooth is provided for each direction of rotation. Therefore, two latching teeth are formed on the control part. Only one latching tooth is actively in each case in an engagement during a run-off; the other one of the two latching teeth remains out of engagement. This second latching tooth therefore cannot cause any ratchet noise. The first latching tooth likewise virtually does not cause any noise.

Preferably, the wobble joint fitting has a wrap spring having an annular spring abutting against the collar. The latching part is retarded by this wrap spring in the case a run-off movement. The cooperation between the actuating portion of the drive part and the actuating flank of the latching part is thus simplified. It is thus prevented more reliably that the drive part does not simply move the latching part with it in the case of a run-off movement. In addition, the wrap spring can be designed in such a manner that it also retards the run-off of the fitting itself; in this regard, reference is also made to the teaching of the aforementioned DE 10 2009 001 309 A1, the disclosure of which in its entirety belongs to the disclosure of the present application.

Preferably, the latching part is connected to the wrap spring, in particular integrally connected. The retarding action caused by the wrap spring is thus transmitted directly to the latching part. In another embodiment, a positive fit connection can be provided between the wrap spring and the latching part. Other configurations are possible. This includes a connection of the wrap spring and the latching part by welding, in particular laser welding.

Preferably, the latching part and/or the annular spring extend over an angle of less than 360°. Thus, the annular spring, which is preferably configured as a spring ring, can be made very flat and requires only very little construction space. As opposed to prior art, no genuine wrap spring is thus used, which is wrapped many times, at any rate at least three times, typically at least 5 times, and accordingly has many windings; instead, a wrap spring is used that extends over less than 360°. Preferably however, it differs as little as possible from 360°. Such a spring can be configured as a flat part, in particular as a stamped sheet steel part. Commercially available springs as they are generally known as axial securing elements on shafts or axles for securing the position or for guidance can be utilized, see for example Dubbel, Taschenbuch des Maschinenbaus, 20. Auflage, Stichwort G36 (Pocket Book of Mechanical Engineering, 20 th Edition, Catchword G 36). Such securing elements are standardized in German standards DIN 471 T1 and T2, DIN 472 T1 and T2, DIN 983 and DIN 984 issued by the German national organization for standardization. They are also referred to as circlip rings. The advantage thereof is that they are very flat, they are planar. Intersections between windings are obviated. Their constructional height is significantly less than 1 mm; it may be less than 0.3 mm. Such a small component part can also be accommodated later inside an existing fitting. This is a great advantage over prior art.

In the assembled state, the latching part is located between components of the wobble joint fitting and not outside of these components or the wobble fitting. In particular, it is located within a space delimited by the fitting parts. Preferably, the latching part and/or annular body of the annular spring are located between the toothed eccentric gear and the eccentric, or in an annular space between the counter toothing of the eccentric gear and the collar. This counter toothing of the external toothing was produced by means of a pressing process, e.g. by pushing, during the production of the external toothing.

The annular spring is preferably controlled via its two end portions. They are configured in such a way that they can be gripped. For example, they protrude radially inwards or outwards; they may also, if necessary additionally, protrude axially relative to the actual ring. It is also possible to use the holes, which are present in a commercially available circlip ring, by fixing pins, for example, in these holes.

Preferably, the control part is responsible for controlling the annular spring. In an advantageous development, it comprises a control flank for each wedge segment, and in addition has opposite control surfaces between which the end portions of the annular spring are located. When the control part rotates, the one or the other control surface strikes against the adjacent end portions of the annular spring. In the normal position, the control surface abuts against these end portions with little pressure, or there is a small air gap between the control surfaces and the end portions.

In an advantageous development, a lug located on the control part, in particular on a wheel of the control part, reaches between the end portions of the annular spring. An adjusting movement is initiated in this manner. When the lug, with a lug flank located to the front in the direction of rotation, presses against the adjacent end portion and drives it, the end portion preferably lifts slightly from the collar. The retarding action is thus reduced.

In an advantageous implementation, the annular spring is thicker in its 6 o'clock area, which is diametrically opposite from the two end portions, than in another area of the extent of the ring. Its thickness decreases continuously starting from this area. This configuration is known from circlips.

Other advantages and features of the invention become apparent from the other claims as well as from the following description of three very similar exemplary embodiments of the invention, which are to be understood not to be limiting and which will be explained below with reference to the drawing.

DESCRIPTION OF PREFERRED EMBODIMENTS

Figure 6:
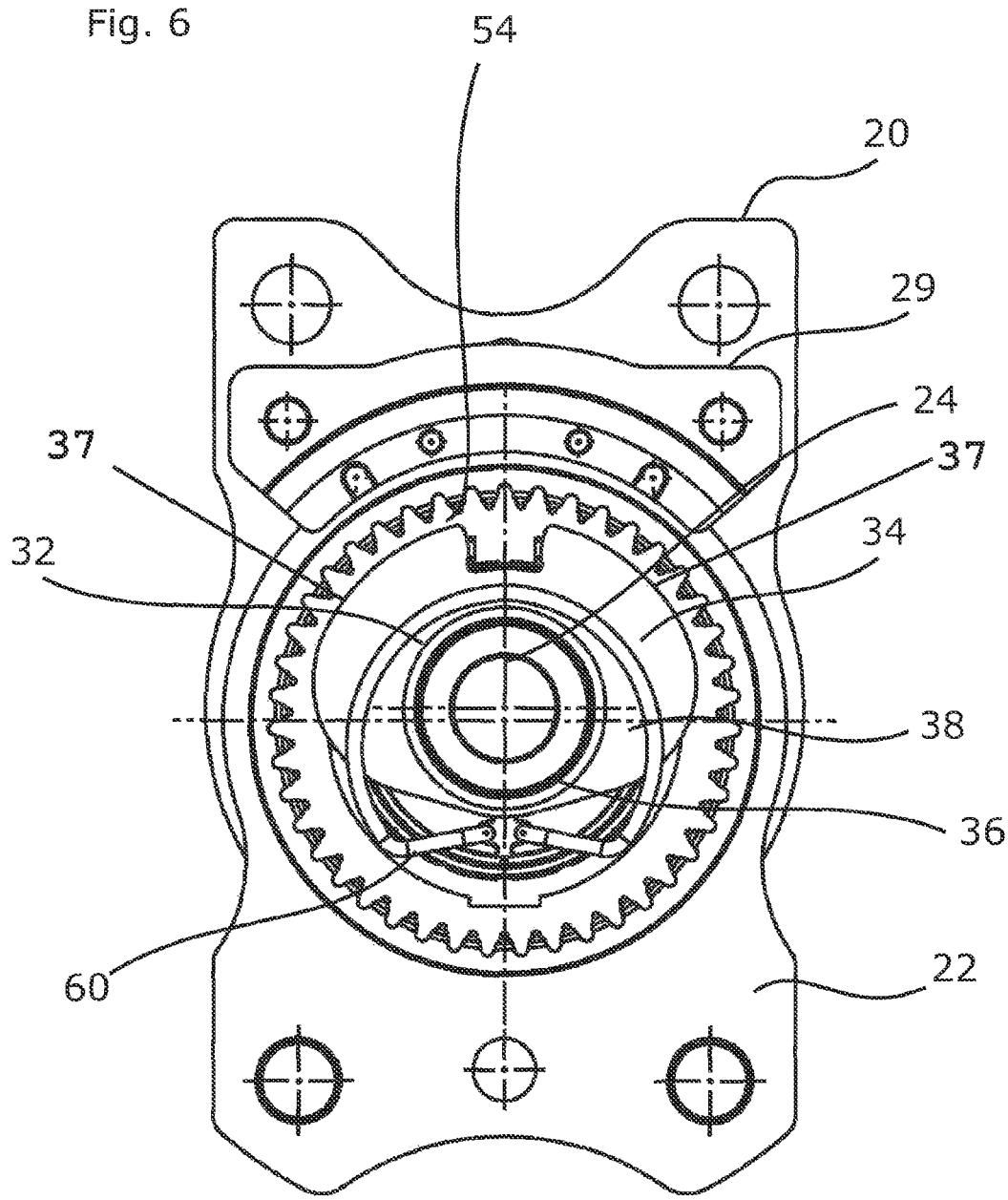
FIG. 6 shows an axial view similar to FIG. 2 for a second exemplary embodiment, with a spring and a control part being provided in addition to FIG. 2.
Figure 7:
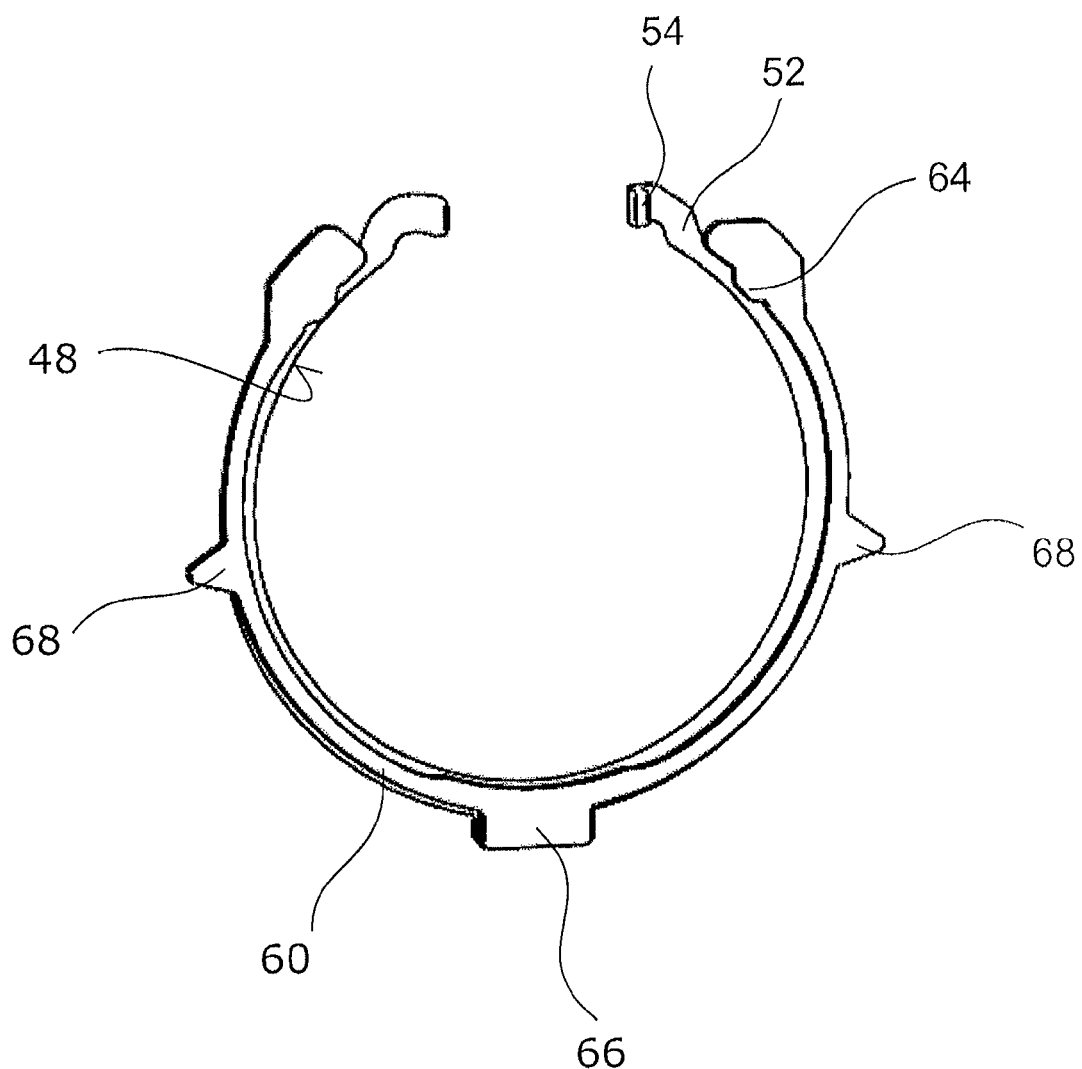
FIG. 7 is a perspective view of the component which forms the annular spring and the latching part at the same time, similar to FIG. 3, but in a different configuration.
Figure 8:
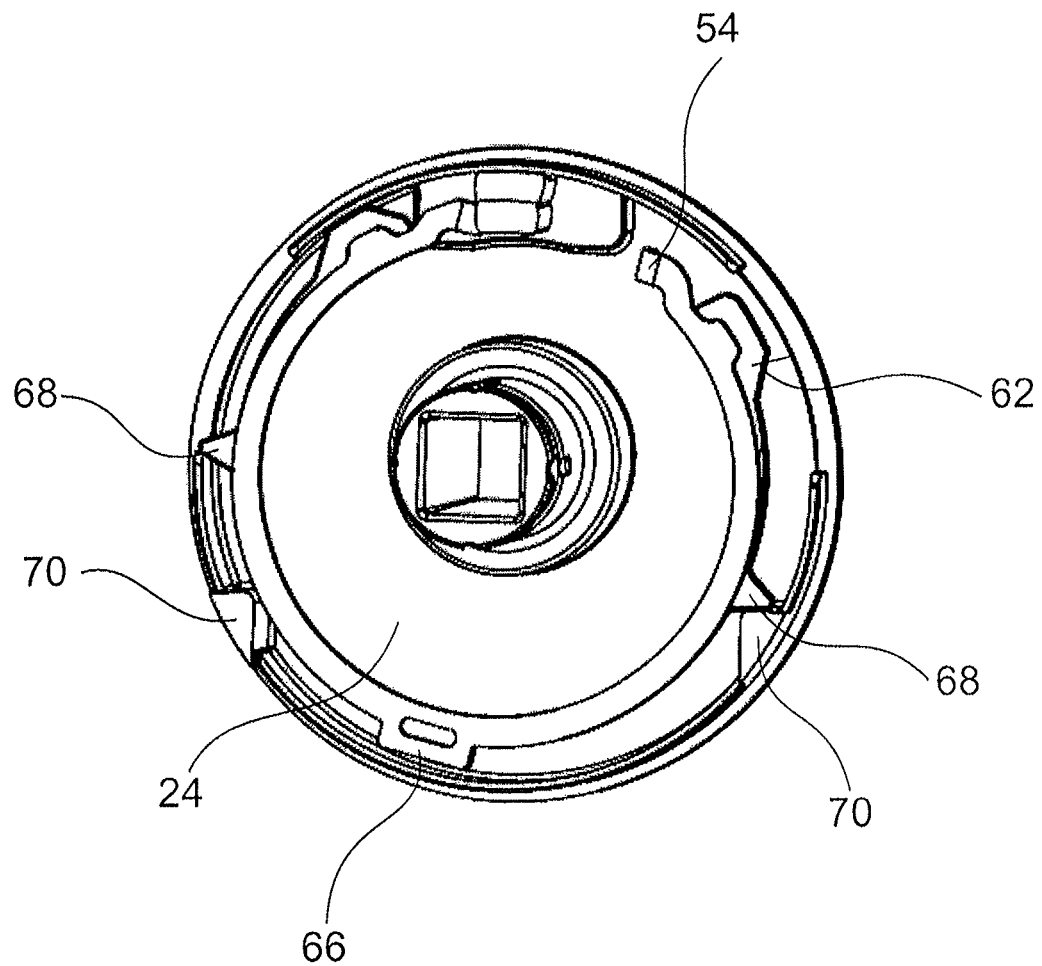
FIG. 8 shows a view with a viewing direction corresponding to VIII-VIII in FIG. 1 with a perspective view.

FIGS. 1 to 5 show a first exemplary embodiment which is explained in more detail below. FIG. 6 shows a second exemplary embodiment, FIGS. 7 and 8 show a third exemplary embodiment. The second and third exemplary embodiments largely match the first exemplary embodiment and are explained only where they deviate therefrom.

The wobble joint fitting comprises a first fitting part 20 and a second fitting part 22. The angular position of these fitting parts 20, 22 relative to each other can be changed in the known manner by rotating a drive part 24. In the exemplary embodiment shown, a toothed eccentric gear 26 is formed on the second fitting part 22. It is in a toothed engagement with an internal ring gear 28 formed on the first fitting part 20. A bridging part 29 retained on the first fitting part 20 reaches over the second fitting part 22 and connects the fitting parts 20, 22.

In another embodiment not shown herein, the eccentric gear 26 is separate from the second fitting part 22. The second fitting part 22 is configured in a similar manner as the first fitting part 20; it thus comprises an internal ring gear 28. The eccentric gear 26 is in engagement with the two internal ring gears of the two fitting parts 20, 22. In this embodiment, the first fitting part 20 and the second fitting part 22 do not move radially relative to each other during an adjustment; only a rotational movement takes place.

Figure 1:
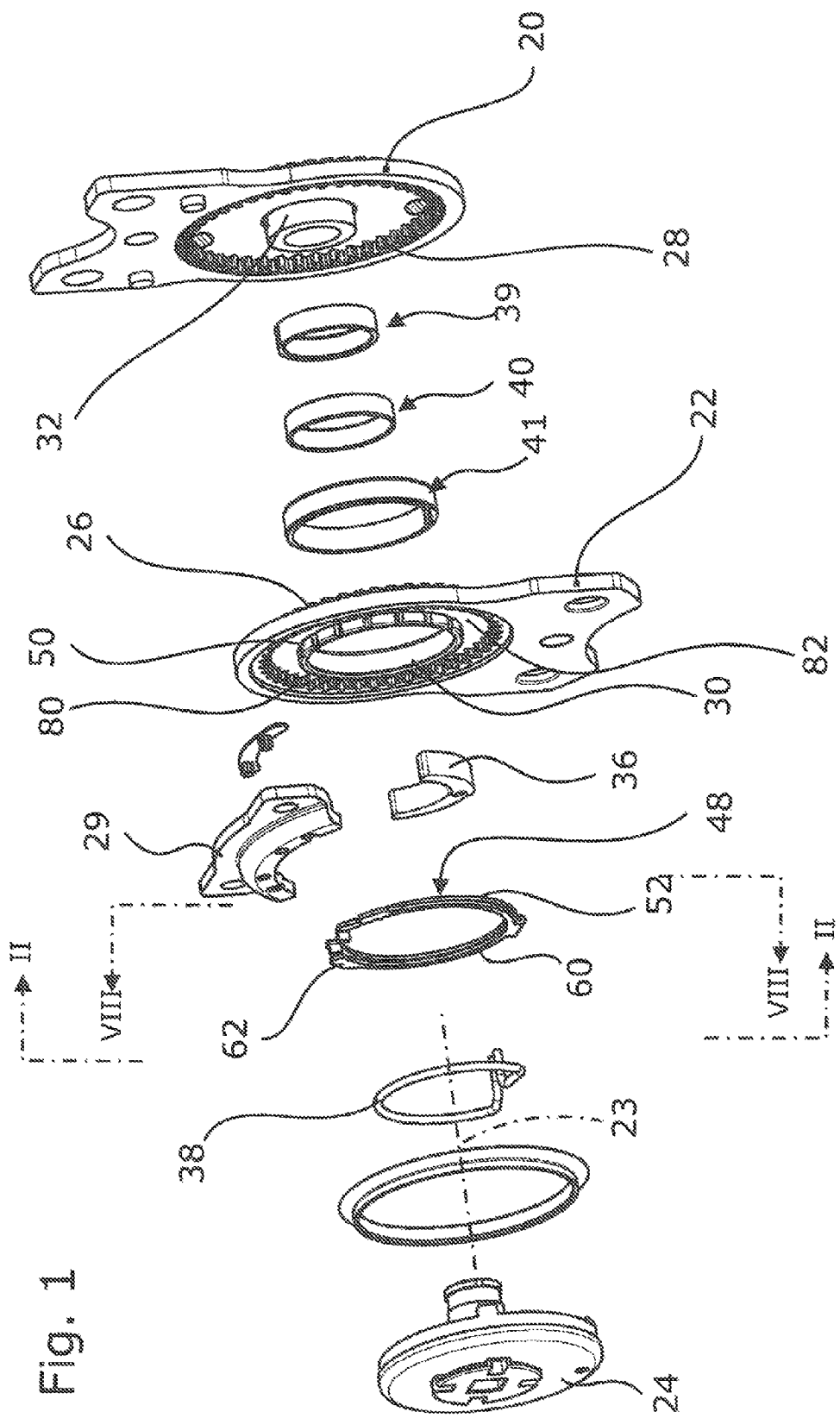
FIG. 1 is a perspective assembly view of the wobble joint fitting in a first exemplary embodiment.
Figure 2:
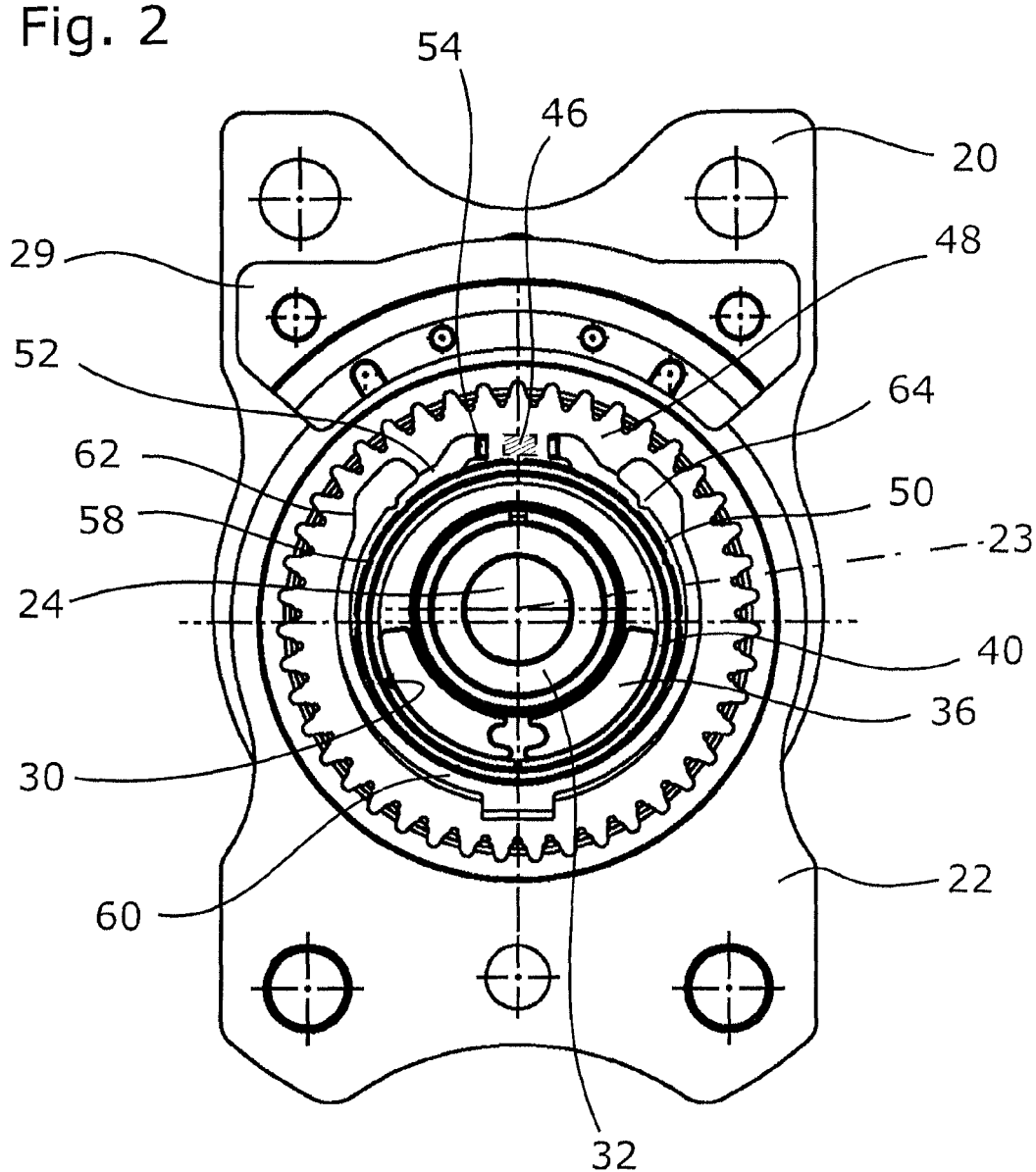
FIG. 2 is an axial view in a direction corresponding to II-II in FIG. 1.

In the exemplary embodiment shown, an eccentric hole 30 is provided on the eccentric gear 26; it is disposed centrally of the ring gear of the eccentric gear 26. An eccentric engages into this eccentric hole 30. It is realized in part by the drive part 24 and in part by the two wedge segments 36. The wedge segments 36 are biased against each other in the circumferential direction by a spring 38, which in this case is configured as a spring in the shape of the Greek letter omega. Freedom from clearance is thus obtained. FIG. 1 also shows several bearing bushes 39, 40 and 41 disposed between the eccentric hole 30 and a collar 32.

In a first exemplary embodiment according to the FIGS. 1 to 5, the drive part 24 is formed as one piece. In the second exemplary embodiment according to FIG. 6, it has a two-piece configuration and comprises a wheel and a control part 34. The wheel is not shown in FIG. 6; in a view according to FIG. 1, it looks similar to the drive part 24 from the first embodiment. The control part 34 comprises two control flanks; they lie opposite from the narrow sides of the wedge segments 36. The control flanks extend radially. The control part 34 further comprises two projections protruding into an annular space 82 between a flange 50 and a counter toothing 80 of the external toothing of the eccentric gear 26. They each comprise an actuating portion 44. In the first exemplary embodiment, these control flanks and the actuating portions 44 are provided on the drive part 24.

An annular spring 48 or spring ring is provided between the eccentric and the eccentric gear 26. The eccentric gear 26 comprises an annular collar which forms on its cylindrical outer surface the collar 50 on which the inner edge of the annular spring 48 rests. By way of kinematic inversion, the collar 50 can also delimit an internal cylinder and the annular spring 48 can abut against the internal cylinder.

The annular spring 48 comprises an annular body 52 which extends over about 330 to 340° and is made from flat material, as well as two end portions 54. The annular spring 48 is preferably of one piece.

In contrast to a normal circlip, the end portions 54 are bent out from the plane of the annular body 52. They thus extend in the axial direction, as can be seen from FIG. 1. Two stop faces are formed in the circumferential direction on each end portion 54. They lie in the opposite direction from each other and are explained in more detail below.

Figure 3:
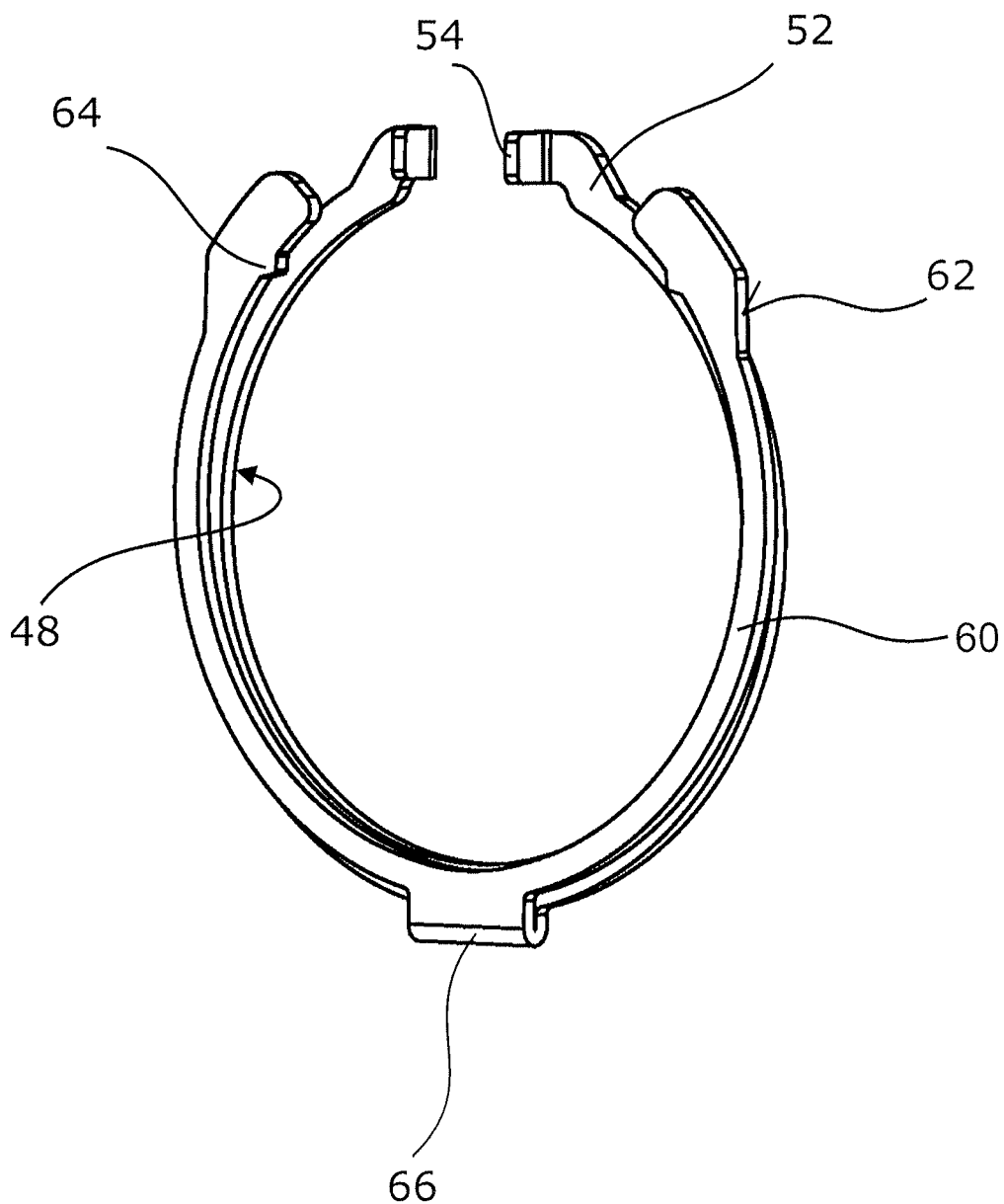
FIG. 3 is a perspective view of a component which forms the annular spring and the latching part at the same time.

In the assembled state, an inner stop face of each end portion 54 is close to or in contact with the lug 46. This can be seen, for example, from FIG. 3 of the aforementioned DE 10 2009 001 309. FIG. 3 shows the normal state, the fitting is blocked. Starting from the position according to FIG. 3, the annular spring 48 is controlled as follows: If the drive part 24 is rotated and the lug 46 thus moves in the circumferential direction, for example in the clockwise direction, the corresponding lug flank abuts hits the internal stop flank of the right-hand end portion 54. Since the contact surface does not extend radially but rather deviates at least 5°, preferably at least 10°, from the radial and since the contact plane forms an angle with an associated diameter and the orientation is such that the inner stop flanks almost lie on parallel planes, the lug 24 lifts the right end portion 54 slightly from the collar 50 upon hitting it. For the subsequent drive movement, the annular spring 48 therefore is slightly lifted and has a less of a clamping action than before.

Latching recesses 58 are disposed uniformly distributed on the collar 50. They are substantially V-shaped and symmetrical relative to a radial. They are configured as notches. A total of 16 of such latching recess 58 is provided. A different number is possible, for example twice the number.

A latching part 60 is located in the annular space 82. It is also configured as a flat annular spring 48 extending over about 250 to 320°. Preferably, the annular body 52 of the latching part 60 extends over a smaller total angle than the annular body 52; the difference is preferably about 20 to 50°. The latching part 60 has thickened portions on its free ends on the end sides. There, one actuating flank 62, respectively, is provided on the narrow outer side, and one latching tooth 64, respectively, is provided on the inner side. The latching tooth 64 and the actuating flank 62 substantially lie on a radial, the angular offset is small; it is between 5 and 15°. The actuating flank 62 rises towards the free end so that the result is the thickened portion on the side of the end which is apparent from the figures. The latching part 60 is located above the annular body 52. The thickness of the latching part 60 plus the thickness of the annular body 52 together is less than the depth of the annular space 82 in the axial direction.

The latching part 60 is kinematically connected to the annular body 52. Both are produced integrally in the exemplary embodiment shown. For this purpose, a pre-cut part is produced from a thin spring sheet; the pre-cut part has the approximate shape of an eight, however, the circles of the eight are respectively open at their extremes. Described in other The words, the pre-cut part has the shape of two U-parts put together at their bases in a mirror image arrangement. This pre-cut part has a web which interconnects the two areas that later form the annular body 52 and the latching part 60. This web is bent by 180° so that the latching part 60 comes to rest above the annular body 52. The resulting component is shown in FIG. 3.

When a joint fitting runs off, the following takes place: In the case of a run-off, the wedge segments 36 lose their purchase; more specifically, the wedge segment 36 which is in the clamping position loses its purchase. It thus moves in the circumferential direction and hits a control flank 37 of the drive part 24 or of its control part 34. The latter is thus rotated as well. This rotary movement leads to the actuating portion 44 sliding along the actuating flank 62 and to the latching part's 60 thickened portion on the end delimited thereby being pushed radially inwardly. The latching tooth 64 located on the inside thus comes into contact with the collar 50. This takes place against the spring action of the latching part 60. Due to the resilient bias, the latching tooth 64 is normally not in contact with the collar 50. The contact with the collar 50 now causes the latching tooth 64 to be able to engage a latching recess 58. A continuation of the rotary movement driven by a run-off may be possibly necessary for this engagement. Once the latching tooth 64 has engaged a latching recess 58, a positive fit is achieved. The run-off movement thus comes to a standstill.

The normal position is reached again in the case of a subsequent movement of the fitting.

Figure 4:
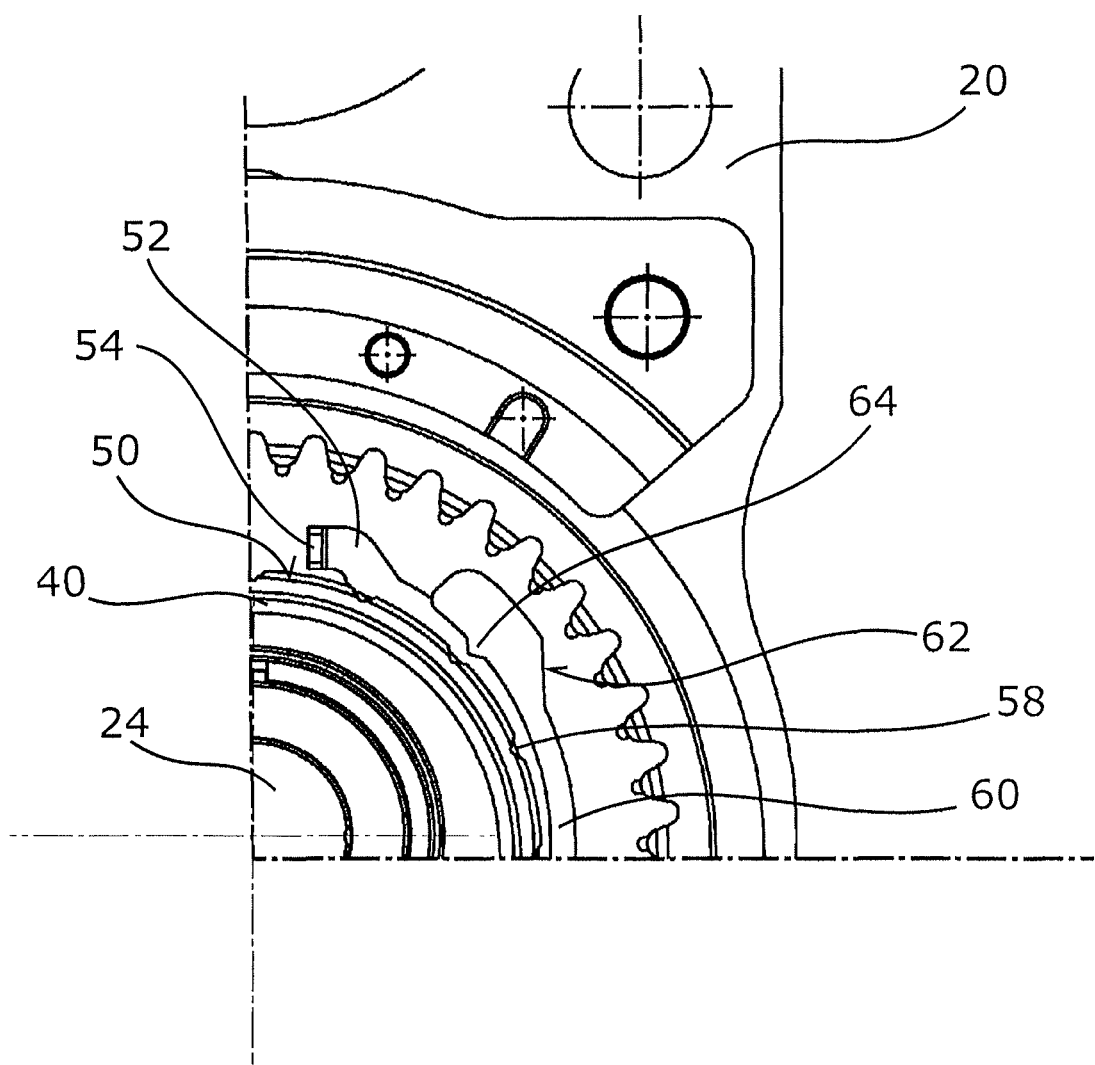
FIG. 4 shows a sector from 12 o'clock to 3 o'clock of an axial view corresponding to FIG. 2, with the normal position being depicted.

FIG. 4 shows the normal position. The latching part 60 is out of engagement with a latching recess 58; the latching tooth 64 does not abut against the collar 50. The actuating flank 62 is not shown in FIG. 4.

Figure 5:
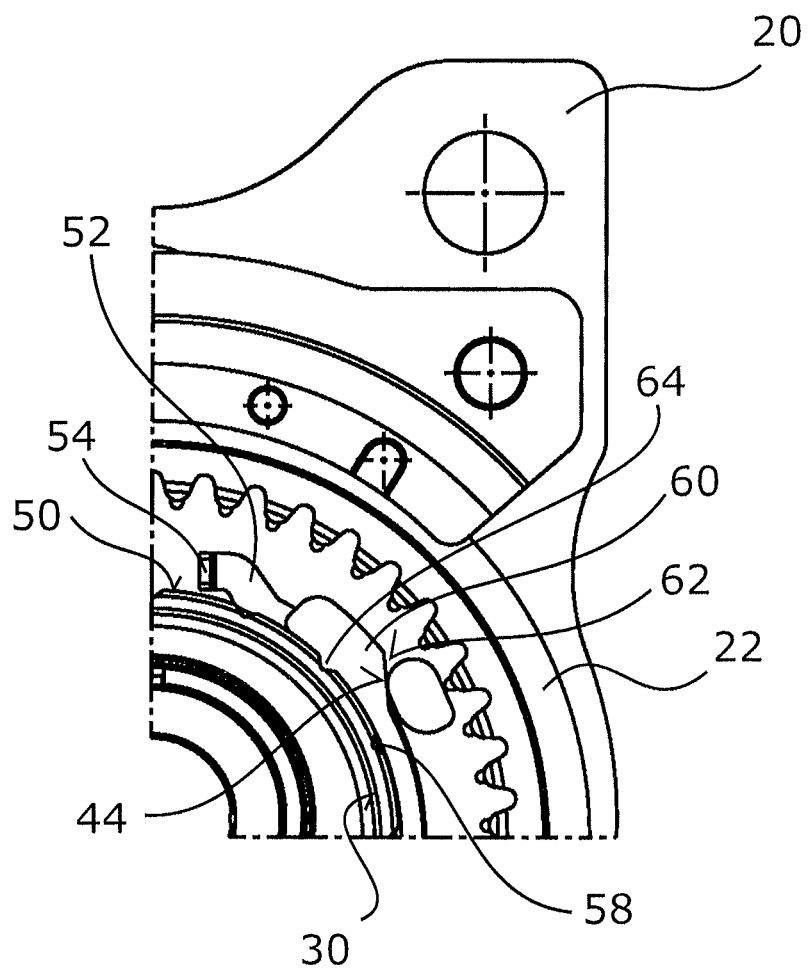
FIG. 5 shows a sector view as in FIG. 4, with the actuation position being depicted.

FIG. 5 shows the actuation position. The actuating flank 62 has been pushed inwards by the actuating portion 44 and is held in that position. This takes place against the resilience of the latching part 60. The latching tooth 64 is in engagement with a latching recess 58. In this engaging position, a run-off is hindered.

The fitting has a largely symmetrical structure. Both the annular body 52 as well as the latching part 60 are mirror-symmetrical to a plane of mirror symmetry defined by a radial and an axis of rotation 23.

A two-part configuration of the drive part 24 as shown in FIG. 6 has the following advantage: In FIG. 6, the lug 46 is disposed on the wheel. The control flanks 37 and the actuating portions 44 are provided on the control part 34. The control part 34 is able to be rotated within certain limits of, for example, maximally 30 to maximally 60° relative to the wheel. In the case of a run-off, only the control part 34 rotated; the wheel remains still. Because the wheel remains still, its lug 46 also remains still, so that the clamping action of the annular spring 48 is not canceled.

As can be seen in FIG. 6, the spring 38 is located between the control part 34 and the wheel of the drive part 24 not shown in FIG. 6.

Preferably, the annular spring 48 and/or the latching part 60 are a stamped part. The end portions 54 have been bent later, after the stamping process.

Preferably, the latching part 60 and/or the spring ring 48, with regard to their geometry, are formed in such a manner that they are located exclusively in an annular space 82 between the flange 50 and a counter toothing 80 of the external toothing of the eccentric gear 26.

The bearing bushes 39 and 40 are located between the collar 32 and the wedge segments 36. The bearing bush 41 is located between the wedge segments 36 and the eccentric hole 30. Preferably, at least one of the bearing bushes is formed in a slotted manner; it therefore does not constitute a closed ring. This preferably applies to the bearing bush 39. The latter sits, preferably secured against rotation, on the collar 32 of the first fitting part 20. This can be achieved by the collar 32 being provided with a rotation-blocking device. A rotation-blocking device is, for example, a projection which protrudes radially outwards from the collar 32, or an impression in the collar 32. This rotation-blocking device can be produced, for example, during the manufacture of the collar formation, or it may be formed later. The rotation-blocking device engages the slot of the bearing bush 39. The bearing bush 39 carries a slide coating on the outer circumference; this may be, for example, a plastic coating, in particular Teflon, or a metal coating. The further, non-slotted outer bearing bush 40 is placed on the outer circumference of the slotted bearing bush 39. It envelops the slotted bearing bush 39. This outer bearing bush 40 is preferably made from steel; it preferably does not comprise a sliding layer. The wedge segments 36 abut with their inner surfaces against the outer bearing bush 40, the inner surfaces are defined by an internal radius. The internal radius of the wedge segments 36 is slightly larger, preferably 5% to 20% larger than the external radius of the outer bearing bush 40. This causes a line contact between the wedge segments and the outer bearing bush 40; in any case, there will be no surface abutment. In this case, the conditions with regard to friction are such that there is a frictional grip between the inner surface of the wedge segments 36 and the outer jacket of the outer bearing bush 40 during actuation, and that these friction partners together slide on the slide-coated outer jacket of the slotted bearing bush 39. Actuation is initiated by means of the control part 34 with its two control flanks 37, which are opposite from the narrow sides of the wedge segments 36. Depending on the direction of rotation, one of the two control flanks 37 comes into engagement with a narrow side of an adjacent wedge segment 36. In an alternative, the collar 32 and the slotted bearing bush 39 constitute a single part, preferably, no separate bearing bush 39 is provided; rather, the collar 32 itself is provided with a slide coating. The construction described above in this paragraph can also be realized independently from the characterizing features of claim 1; in any case, not all features of claim 1 are required.

The third exemplary embodiment according to the FIGS. 7 and 8 also largely corresponds to the exemplary embodiment discussed so far. The differences are discussed below.

Whereas the latching tooth 64 is configured to be pointed in the first two embodiments, it is now configured to be wider; it has a trough-shape. It does not have a tip. It has a projection with a width of at least 1 mm.

In the first two exemplary embodiments, the latching part 60 is released by being entrained on a lower contour 66. This release is now at a different location. It has been rearranged by 90° in both directions of rotation. The blocking part 60 now has one cam 68, respectively, which protrudes radially outward from the blocking part 60 and is offset by about 90° relative to the lower contour 66. The two cams 68 are disposed relative to each other at an angle of between 150° and 210°, preferably about 180°. A counter-cam 70 for each of the two cams 68 is provided on the drive part 24. The angular position is such that, when the one cam 68 abuts against its adjacent counter cam 70, the other cam 68 has a distance from its adjacent counter cam 70 of between 10° to 40°, in particular 25° to 35°. The two counter cams 70 are disposed relative to each other at an angle of between 120° and 180°, preferably about 150°.

As may be recognized by those of ordinary skill in the pertinent art based on the teachings herein, numerous changes and modifications may be made to the above-described and other embodiments of the present invention without departing from the spirit of the invention as defined in the claims. For example, the components of the apparatus may be made of any of numerous different materials that are currently known, or that later become known for performing the function(s) of each such component. Similarly, the components of the apparatus may take any of numerous different shapes and/or configurations, additional components may be added, components may be combined, and one or more components or features may be removed.

What is claimed is:

1. A wobble joint fitting for an adjustment device of a motor vehicle seat comprising:
    a first fitting part comprising an internal ring gear;
    a toothed eccentric gear engaging the internal ring gear and comprising an eccentric hole and an annular collar having a cylindrical inner or outer surface;
    an eccentric comprising a rotatable drive part, a control part and wedge segments, configured and adapted to cause the toothed eccentric gear to engage the internal ring gear of the first fitting part, the eccentric configured and adapted to maintain the wedge segments in engagement with the collar, the control part comprising control surfaces coming to abut against the wedge segments;
    a second fitting part operatively connected to the toothed eccentric gear and adjustable with respect to the first fitting part, wherein the cylindrical inner or outer surface has a circumference and the cylindrical outer surface comprises latching recesses distributed over the circumference of the surface, a latching part is provided having at least one latching tooth, the latching tooth in a non-actuation position of the latching part is out of engagement with a latching recess and is biased in an actuation position of the latching part into engagement with a latching recess, the latching part further comprises an actuating flank, and the control part comprises an actuating portion coming to abut against the actuating flank and, during a rotary movement of the control part, presses the latching tooth into abutment against the collar and thereby biases the latching tooth for engagement into a latching recess.

2. The wobble joint fitting according to claim 1, further comprising an annular spring abutting against the collar.

3. The wobble joint fitting according to claim 2, wherein the annular spring is integral with the latching part.

4. The wobble joint fitting according to claim 2, wherein the annular spring defines an annular body and two end portions, the end portions protrude from the annular body, the drive part comprises a lug, the lug is located between the two end portions of the annular spring.

5. The wobble joint fitting according to claim 2, wherein the annular spring comprises an annular body and two end portions protruding from the annular body, and wherein the eccentric gear defines a counter toothing of the external toothing radially spaced from the collar, and the collar and the counter toothing define an annular space therebetween, and the end portions and the actuating portion are located in the annular space.

6. The wobble joint fitting according to claim 2, wherein the annular spring comprises an annular body, and at least one of the latching part and the annular body of the annular spring has a material thickness of one of maximally 2, maximally 1, and maximally 0.7 mm.

7. The wobble joint fitting according to claim 2, wherein the annular spring comprises an annular body, and at least one of the latching part and the annular body of the annular spring deviates from planar by maximally less than the material thickness of the respective latching part or annular body.

8. The wobble joint fitting according claim 2, wherein the annular spring comprises an annular body and two end portions protruding from the annular body, and at least one of the latching part and the annular body of the annular spring, in an area diametrically opposite from the end portions, is wider in a radial direction than in any other area of its circumference.

9. The wobble joint fitting according to claim 2, wherein at least one of the latching part and the annular spring extends circumferentially less than 360°, said circumferential extension of the latching part being smaller by at least 5 degrees than said circumferential extension of the annular spring.

10. The wobble joint fitting according to claim 2, wherein at least one of the latching part and the annular spring extends circumferentially an angle greater than or equal to 300°.

11. The wobble joint fitting according to claim 2, wherein at least one of the latching part and the annular spring is located axially between the second fitting part and the drive part.

12. The wobble joint fitting according to claim 2, wherein the toothed eccentric gear defines an external toothing and wherein at least one of the latching part and the annular spring are located axially exclusively in an annular space between the collar and a counter toothing of the external toothing of the eccentric gear.

13. The wobble joint fitting according to claim 1, wherein the control part comprises, for each wedge segment, a control flank lying opposite from a narrow side of the wedge segment.

14. The wobble joint fitting according to claim 13, further comprising an annular spring, wherein the control part extends in a circumferential direction over a first angle, the annular spring extends in a circumferential direction over a second angle, and the first angle is smaller than the second angle by at least five degrees.

15. The wobble joint fitting according to claim 13, wherein the latching tooth and the actuating flank are substantially radially aligned with a circumferentially angular offset from radial alignment by between about 5° and about 35°.

16. The wobble joint fitting according to claim 1, wherein the latching part has at least one free end, the free end has end sides, the latching part comprises a thickened portion on the at least one free end on the end sides, one actuating flank, respectively, is provided on a narrow outer side of the thickened portion and one latching tooth, respectively, is provided on a narrow inner side, and the actuating flank increases the width of the latching part towards the free end to form the thickened portion.

17. The wobble joint fitting according to claim 1, wherein the second fitting part comprises an internal toothing and is in engagement with a separately formed eccentric gear.

18. A wobble joint fitting for an adjustment device of a motor vehicle seat comprising:
  a first fitting part comprising an internal ring gear;
  a toothed eccentric gear engaging the internal ring gear and comprising an eccentric hole and an annular collar having a cylindrical inner or outer surface;
  an eccentric comprising a rotatable drive part, a control part and wedge segments, configured and adapted to cause the toothed eccentric gear to engage the internal ring gear of the first fitting part, the eccentric configured and adapted to maintain the wedge segments in engagement with the collar, the control part comprising control surfaces coming to abut against the wedge segments;
  a second fitting part operatively connected to the toothed eccentric gear and adjustable with respect to the first fitting part, wherein the cylindrical inner or outer surface has a circumference and the cylindrical outer surface comprises latching recesses distributed over the circumference of the surface, a latching part is provided having at least one latching tooth, the latching tooth in a non-actuation position of the latching part is out of engagement with a latching recess and is biased in an actuation position of the latching part into engagement with a latching recess, the latching part further comprises an actuating flank, and the control part comprises an actuating portion coming to abut against the actuating flank and, during a rotary movement of the control part, presses the latching tooth into abutment against the collar and thereby biases the latching tooth for engagement into a latching recess, and, when the wobble joint fitting runs off, one of the wedge segments which is in a clamping position moves in a circumferential direction and causes the control part to rotate and the actuating portion slides along the actuating flank and the latching tooth comes into contact with a latching recess.

19. A wobble joint fitting for an adjustment device of a motor vehicle seat comprising:
  a first fitting part comprising an internal ring gear;
  a toothed eccentric gear engaging the internal ring gear and comprising an eccentric hole and an annular collar having a cylindrical inner or outer surface;
  an eccentric comprising a rotatable drive part, a control part and wedge segments, configured and adapted to cause the toothed eccentric gear to engage the internal ring gear of the first fitting part, the eccentric configured and adapted to maintain the wedge segments in engagement with the collar, the control part comprising control surfaces coming to abut against the wedge segments;
  a second fitting part operatively connected to the toothed eccentric gear and adjustable with respect to the first fitting part, wherein the cylindrical inner or outer surface has a circumference and the cylindrical outer surface comprises latching recesses distributed over the circumference of the surface, a latching part is provided having at least one latching tooth, the latching tooth in a non-actuation position of the latching part is out of engagement with a latching recess and is biased in an actuation position of the latching part into engagement with a latching recess, the latching part further comprises an actuating flank, and the control part comprises an actuating portion coming to abut against the actuating flank and, during a rotary movement of the control part, presses the latching tooth into abutment against the collar and thereby biases the latching tooth for engagement into a latching recess, and wherein the actuating flank defines a thickened portion that widens the latching part at an angle oblique to a radial direction.

\* \* \* \* \*